No. 871,271. PATENTED NOV. 19, 1907.
S. HALL.
COVER FOR JUGS, TEAPOTS, AND LIKE VESSELS.
APPLICATION FILED MAY 11, 1907.

WITNESSES:
Allan Bennett.
Samuel Burgess.

INVENTOR:
SILAS HALL.
per John E. Walsh
ATTORNEY.

UNITED STATES PATENT OFFICE.

SILAS HALL, OF MORECAMBE, ENGLAND.

COVER FOR JUGS, TEAPOTS, AND LIKE VESSELS.

No. 871,271.     Specification of Letters Patent.     Patented Nov. 19, 1907.

Application filed May 11, 1907. Serial No. 373,100.

*To all whom it may concern:*

Be it known that I, SILAS HALL, a subject of the King of Great Britain and Ireland, residing at Morecambe, in the county of Lancaster, England, have invented a new and useful Improvement in Covers for Jugs, Teapots, and Like Vessels, of which the following is a specification.

This invention relates to an improved cover for jugs, teapots, and like vessels, such improved cover being adapted to fit various sizes of vessels, and being so arranged as to be quickly and securely attached to the vessel, and to be instantly detachable therefrom when required.

Description of Drawings.

Similar letters of reference are employed to indicate corresponding parts throughout the several views.

Figure 1:
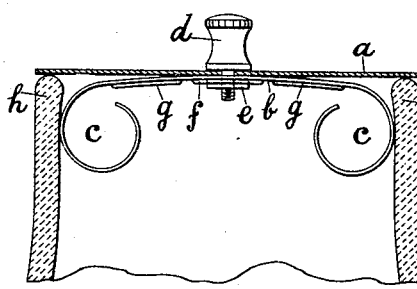
Figure 1 is a vertical section of a cover and a portion of a vessel.
Figure 2:
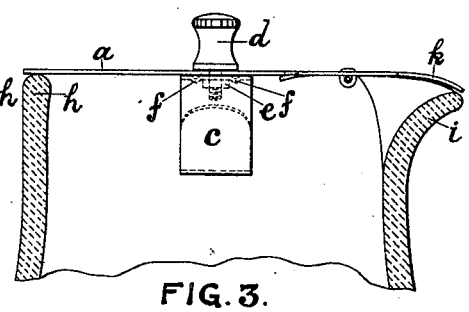
Fig. 2 is a side view of a cover at right angles to Fig. 1 and also showing a portion of a vessel in section.
Figure 3:
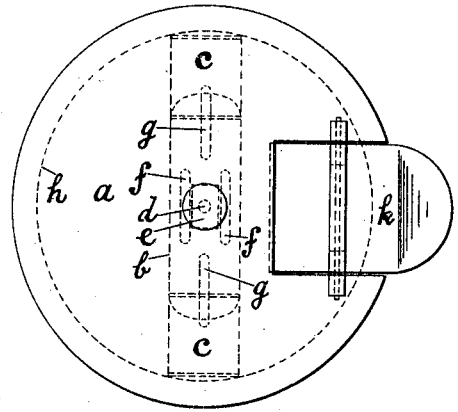
Fig. 3 is a top plan view of the cover.
Figure 4:
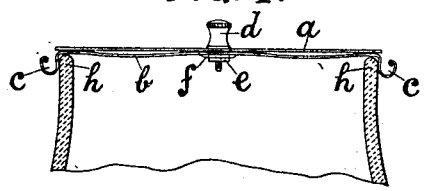
Fig. 4 is a side view of a cover, showing a modification, and showing also a portion of a vessel in section.
Figure 5:
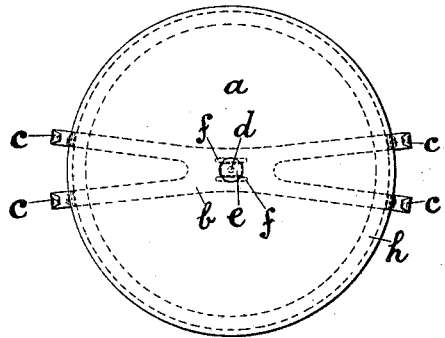
Fig. 5 is a top plan view of the cover shown in Fig. 4.

In applying my invention I provide a metal cover or lid $a$ having on its under side a crosspiece $b$ of pliable metal, the said crosspiece $b$ terminating in expansion scrolls $c$ so as to form a spring fastener for the cover $a$. The crosspiece $b$ is secured to the cover $a$ by means of a milled thumbscrew $d$ and nut $e$, the nut fitting between guide ribs $f f$ in the crosspiece to prevent the nut from rotating with the thumbscrew as the latter is tightened or slackened. The crosspiece $b$ is provided also with stiffening ribs $g g$ in the part between the spring expansion scrolls $c$.

When the cover $a$ is placed upon the vessel, and a slight downward pressure is applied, the spring expansion scrolls $c$ are forced within or over the rim $h$ of the vessel (which rim $h$ is slightly thickened or tapered as shown), and the cover is thus held securely in position by the pressure of the scrolls $c$ upon the rim. Slight variations in diameter of the vessels at the rim may be allowed for by opening out or turning in the ends of the scrolls $c$.

For jugs or vessels having a projecting lip $i$, the cover $a$ has a small cut-away recess to receive a projecting hinged flap $k$, this flap $k$ being so balanced as to rest upon and cover the lip $i$ so long as the vessel remains in an upright position, while instantly yielding to the upward pressure of liquid when the same is poured from the vessel. This arrangement enables the liquid in the jug or vessel to be poured out freely without the usual liability to spill or drip the liquid over the sides of the vessel.

I claim:

1. The combination, with a flat cover plate having a central hole, of a spring retaining-plate having longitudinal guide and stiffening ribs at its middle part, a nut arranged between the said ribs so that it cannot be revolved, and a thumbscrew which passes through the said hole and engages with the said nut.

2. The combination, with a cover plate, of a fastening plate provided with longitudinal guide and stiffening ribs at its middle part and having spring scrolls at its ends for engaging with the vessel, a nut engaging with the said ribs, and a screw which engages with the said nut and secures the two said plates together.

SILAS HALL.

Witnesses:
   JOHN E. WALSH,
   ALLAN BENNETT.